(12) United States Patent
Kaul et al.

(10) Patent No.: US 6,348,562 B1
(45) Date of Patent: Feb. 19, 2002

(54) SYNTHETIC POLYAMIDES

(75) Inventors: Bansi Lal Kaul, Biel-Benken (CH); Jan Malik, St. Louis; Mohamed Sidqi, Mulhouse, both of (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/229,205

(22) Filed: Jan. 13, 1999

(30) Foreign Application Priority Data

Jan. 17, 1998 (GB) .............................. 9800935

(51) Int. Cl.$^7$ .............................. C08G 69/32
(52) U.S. Cl. .................. 528/310; 528/170; 528/322; 528/332; 528/335; 528/336; 528/340; 528/341; 528/347; 525/432
(58) Field of Search ................. 528/347, 340, 528/341, 332, 335, 336, 310, 322, 170; 525/432

(56) References Cited

U.S. PATENT DOCUMENTS

| | | | |
|---|---|---|---|
| 3,907,803 A | * 9/1975 | Ramey et al. ............... 260/270 |
| 4,001,181 A | * 1/1977 | Ramey et al. ......... 260/45.7 N |
| 4,303,564 A | 12/1981 | Kuroshima et al. ....... 260/23 X |
| 4,983,738 A | 1/1991 | Kazmierczak et al. ...... 546/208 |
| 5,037,448 A | 8/1991 | Kaul ............................. 8/539 |
| 5,300,545 A | 4/1994 | Kazmierczak et al. ...... 524/102 |
| 5,316,553 A | 5/1994 | Kaul et al. ..................... 8/639 |
| 5,324,834 A | 6/1994 | Borzatta et al. ............. 544/194 |
| 5,470,921 A | 11/1995 | Kaul et al. ................... 528/340 |
| 5,493,022 A | 2/1996 | Kaul et al. ................ 544/193.2 |
| 5,510,403 A | 4/1996 | Kaul ............................. 524/90 |
| 5,523,387 A | 6/1996 | Goldmann et al. .......... 534/728 |
| 5,932,640 A | 8/1999 | Kaul et al. ................... 524/102 |
| 5,965,261 A | 10/1999 | Webster ....................... 428/364 |
| 5,976,417 A | 11/1999 | Bechtold et al. ............. 242/405 |
| 6,063,843 A | 5/2000 | Sidqi et al. .................. 524/100 |
| 6,126,736 A | 10/2000 | Stoll et al. ................... 106/506 |
| 6,126,861 A | 10/2000 | Bechtold ...................... 252/401 |

FOREIGN PATENT DOCUMENTS

| | | |
|---|---|---|
| EP | 0379 470 | 7/1990 |
| GB | 1318559 | 5/1973 |
| WO | WO 97/43335 | 11/1997 |

OTHER PUBLICATIONS

PCT International Search Report.
Patent Abstracts of Japan —07033738, Feb. 3, 1995 (MitsubishiI Chem Corp.).
Patent Abstracts of Japan—09041217, Feb. 10, 1997 (Teijin Ltd).

* cited by examiner

Primary Examiner—P. Hampton-Hightower
(74) Attorney, Agent, or Firm—Susan S. Jackson; Scott E. Hanf

(57) ABSTRACT

A process of increasing the melt processing of synthetic polyamides, in particular pigmented and/or filled synthetic polyamide, by adding thereto an additive having the formula (I)

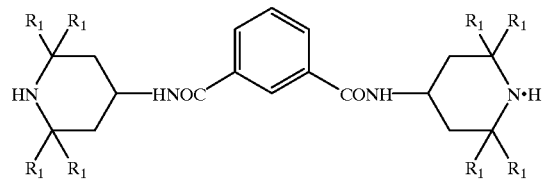

(I)

wherein $R_1$ represents a methyl group
as such or in the form of a stabilizer masterbatch composition.

The invention also relates to modified synthetic polyamides obtainable by this process having improved properties due to the stabilization effect of the compound of the above formula (I).

5 Claims, No Drawings

SYNTHETIC POLYAMIDES

This invention relates to a process of improving the melt processing of synthetic polyamides.

Synthetic polyamides, often referred to as Nylons, are widely used engineering plastics due to their excellent mechanical properties at high temperatures, high strength, stiffness, wear and abrasion resistance, low friction and good chemical resistance. Nylons of all types are used in many industries. The most common polyamide products are fibers and injection molded articles. In the course of the preparation of final product, polyamides have to be exposed to melt processing operations in various types of extruders.

Extrusion operations are complex processing operations by which the raw material formulations are converted into a continuous and often complex extrudate. The extruder geometry and the operating conditions are extremely important parameters that can influence the melting of the polymer and hence also output rate of the extrusion process and uniformity of the extrudate, which is of crucial importance for stability of the process as well as for properties of the final polymer product. With the known stabilizers it is not possible to influence the melt processing properties of synthetic polyamides.

It is the object of the present invention to provide a unique stabilizer specially tailored for use in polyamides to overcome the above-mentioned short-comings.

In WO 97/43335 a process of increasing the heat stability, light stability, chemical stability and dye affinity of synthetic polyamides is described which consists in the addition of an additive having the formula (I) as defined below and it has been disclosed that the addition of such additive also improves the spinnability of fibers consisting of synthetic polyamides. The cited document is however silent on the improvement of processability in non-fibers applications and of fibers which have been colored in the mass.

It has now been found that the addition of an additive having the formula (I) as defined below increases quite generally the stability of polyamide melt pressure which leads to higher throughput and quality of injection molded or extruded polyamide articles. This effect is surprising because it was not observed until now with other derivatives of 2,2,6,6-tetra-methylpiperidine.

In a study on polyamide extrusion parameters it was found that the uniformity of the extrusion process and the output of the extruder can be significantly influenced by the addition of an additive having the formula (I) as defined below.

The invention, therefore, provides in one of its aspects a method of improving the melt processing of synthetic polyamides which have been colored in the mass and in non-fiber applications of synthetic polyamides and in particular pigmented and/or filled synthetic poly-amides by mixing therewith an effective amount of an additive according to the formula (I)

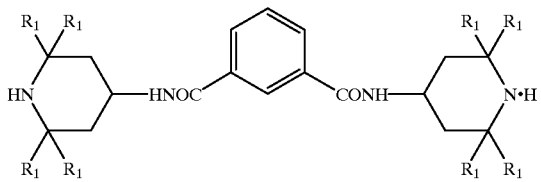

(I)

wherein $R_1$ represents a methyl group.

By adding an effective amount of the additive hereinabove described to synthetic polyamide one is able to improve the melt processing stability of the dyed or pigmented polyamide without affecting certain desirable physical characteristics of the polymer, for example the relative viscosity and the degree of polymerization.

The additive according to formula (I) may be present in the synthetic polyamide in amounts of from 0.01 to 5.0%, preferably 0.05 to 1.0% by weight based on the total weight of the stabilized synthetic polyamide.

The polyamide to be stabilized can be a homopolyamide, a copolyamide, a mixture or blend of polyamides or of a polyamide and another polymer.

Preference is given to homopolyamides and/or copolyamides made from ω-aminocaproic acid, ω-aminoenanthoic acid, ω-aminocaprylic acid, ω-aminopelargonic acid, ω-aminocapric acid, ω-aminoundecanoio acid, a)-aminolauric acid, caprolactam, lactam-7, lactam-8, lactam-9, lactam-10, lactam-11 and/or laurolactam.

The polyamides to be stabilized can also be selected from the group of polyamides made, for example from dimethylenediamine, trimethylenediamine, tetramethylenediamine, pentamethylenediamine, hexamethylenediamine, polyetherdiamine and mixtures thereof on the one hand, and oxalic acid, malonic acid, succinic acid, glutaric acid, adipic acid, pimelic acid, suberic acid, azelaic acid, sebacic acid, nonedicarboxylic acid, decanedicarboxylic acid, undecanedioic acid, dodecanedioic acid, dimerised fatty acids and mixtures thereof on the other hand.

The preparation of synthetic polyamides stabilized according to the invention can be effected by conventional means, preferably by melt blending of the additive of formula (I) with synthetic polyamide in a suitable equipment, for example in an extruder prior to molding or spinning operations. The additive can also be incorporated prior or during the polycondensation process in preparation of the synthetic polyamide itself.

Synthetic polyamides used in the invention are preferably dyed or pigmented, for example by topical application or by application in the melt in accordance with conventional methodology. Any type of dyestuff or pigment is suitable provided that it is stable at the high temperatures encountered in the melt. Preferred dyestuffs are monoazo complexes, in particular, the chromium complexes that are sufficiently stable at the high working temperatures encountered in, e.g. a spinning process. Preferred reactive dyestuffs are those halogen-containing triazinyl or vinyl group-containing metallized azo dyestuffs, in particular, those metallized with chromium, nickel or copper. Preferred pigments are, for example Carbon black, Pigment Yellow 192, Pigment Orange 68 and Pigment Red 149. Preferred polymer soluble dyes are for example Solvent Red 179.

If dyestuffs or pigments are employed in the synthetic polyamides they are preferably employed in amounts of from 0.1 to 10 parts, more preferably, 0.1 to 4 parts per 100 parts of the synthetic polyamide.

Synthetic polyamides may additionally comprise fillers or fibers, for example glass spheres or glass fibers, and/or delusterants, for example titanium dioxide which may be present in proportions of from 0.1 to 5.0 parts, more preferably 0.2 to 2.0 parts, e.g. 0.2 parts per 100 parts of polyamide.

The invention provides in a further one of its aspects a modified synthetic polyamide obtainable by the process hereinabove defined which polyamide has improved melt processing stability.

In the following example all parts and percentages are by weight and all temperatures are given in degrees Celsius.

EXAMPLE 1

Polyamide 6 (Ultramid BV 400 N produced by BASF) is extruded in a single screw laboratory extruder Collin (LAD 25) in presence of different amounts of the additive according to formula I. The milled polyamide powder is first dry blended with the additive and then extruded at different temperatures as given in Table 1 below and at 50 revolutions per minute. The extruded polymer strand is water chilled and pelletized by a laboratory strand granulator. The measured parameters are: a) extruder output (expressed in [kg/h]); b) extruder torque profile—followed by electric current consumption of the extruder engine during the extrusion (in [A]). The electric current readings are recorded every 4 seconds during the process and at the end an average value is calculated. The instabilities of the extrusion process are checked according to standard deviation (STDEV) of the electric current readings. STDEV is a measure of how widely are values dispersed from the average value. A higher value of STDEV clearly indicates higher instability of the extrusion process.

TABLE 1

| Extrusion temp. [° C.] | additive conc. [wt. %] | Output [kg/h] | Torque avrg. [A] | STDEV |
|---|---|---|---|---|
| 285 | 0.05 | 1.56 | 1.79 | 0.105 |
| 285 | 0.55 | 2.70 | 1.87 | 0.068 |
| 320 | 0.12 | 2.46 | 1.49 | 0.723 |
| 320 | 0.48 | 3.36 | 1.68 | 0.173 |

EXAMPLE 2

Polyamide 6 (Ultramid BV 400 N) powder was dry blended with a black pigment masterbatch Sandofil Black HP BF (in a ratio to have 1% of the black pigment in the final composition), and with 0.3wt. % of the additive according to formula I. A reference blend was prepared without the additive. The prepared dry blends were extruded in a single screw laboratory extruder Collin (L/D 25) at 285° C. and at 50 revolutions per minute. The extruded polymer strand was water chilled and pelletized by a laboratory granulator. The measured parameter was extruder output:

| Additive conc. MN | Output [kg/h] |
|---|---|
| no | 2.72 |
| 0.30 | 3.15 |

The output increase (about 16%) in the presence of the additive is also confirmed in the case of pigmented PA6.

What is claimed is:

1. A process of improving the melt processing of synthetic polyamides which have been colored in the mass and in non-fiber applications of synthetic polyamides comprising incorporating therein before or during processing an effective amount of a compound of formula (I) as such or in the form of a masterbatch composition

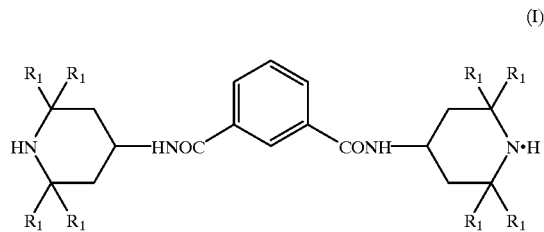

(I)

wherein $R_1$ represents a methyl group.

2. A process according to claim 1 wherein the compound of formula (I) is added in an amount of from 0.01 to 5.0 parts by weight per 100 parts by weight of the synthetic polyamide.

3. A process according to claim 1 wherein the polyamide is a homopolyamide, a copolyamide, a mixture or blend of polyamides or of a polyamide and another polymer.

4. A synthetic polyamide produced by the process according to claim 1 and any article manufactured therefrom.

5. A method of using a compound of formula (I)

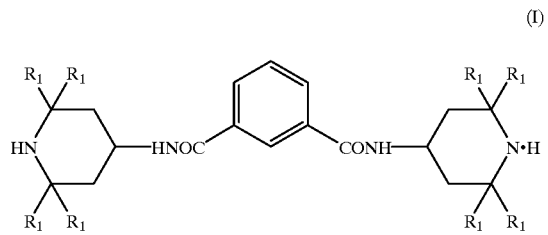

(I)

as a melt processing stabilizer in a synthetic polyamide comprising incorporating in the polyamide before or during processing an effective amount of the compound of formula (I) as such or in a form of a masterbatch composition, wherein $R_1$ represents a methyl group.

* * * * *